(12) United States Patent
Farlow et al.

(10) Patent No.: US 6,633,859 B1
(45) Date of Patent: Oct. 14, 2003

(54) KNOWLEDGE SYSTEM WITH DISTINCT PRESENTATION AND MODEL STRUCTURE

(75) Inventors: Timothy S. Farlow, Needham; Daniel Silva, Rockland; Didier Barnes-Guzman, Woburn, all of MA (US)

(73) Assignee: Authoria, Inc., Waltham, MA (US)

( * ) Notice: Subject to any disclaimer, the term of this patent is extended or adjusted under 35 U.S.C. 154(b) by 0 days.

(21) Appl. No.: 09/375,626

(22) Filed: Aug. 17, 1999

(51) Int. Cl.[7] .................................................. G06N 5/00
(52) U.S. Cl. ......................... 706/45; 707/102; 707/517
(58) Field of Search ............................. 700/86; 707/102, 707/517; 706/45

(56) References Cited

U.S. PATENT DOCUMENTS

| | | | |
|---|---|---|---|
| 5,895,476 A | * 4/1999 | Orr et al. | 707/517 |
| 5,895,477 A | * 4/1999 | Orr et al. | 707/517 |
| 5,903,902 A | * 5/1999 | Orr et al. | 707/517 |
| 5,956,737 A | * 9/1999 | King et al. | 707/517 |
| 6,108,662 A | * 8/2000 | Hoskins et al. | 707/102 |
| 6,161,051 A | * 12/2000 | Hafemann et al. | 700/86 |

OTHER PUBLICATIONS

Fonda Berosini and Gary McCormick. "$8.5 Million in Funding Affirms Foundation Technologies as the Market Leader in Knowledgebase Software for Human Resources." Mar. 10, 1998.

Thomas Clohesy. "Price Waterhouse and Foundation Technologies Launch Global alliance in Human Resource Consulting and Software Areas." Feb. 5, 1998.

Bob Wice and Michael Neumeier. "Employease and Foundation Technologies Partner to Co–market Services Employease also Integrates Foundation Technologies' Products into Call Center and Employee Self Service."May 12, 1998.

*iExpert Announces the Release of iExpert Version 1.1.7.* (Dec. 11, 1998), available at http://www.proacttechnologies.com.

*iExpert Sold to Private Investors; Roger J. Leigh is named President and CEO.* (Jul. 1, 1998), available at http://www.proacttechnologies.com.

* cited by examiner

Primary Examiner—Wilbert L. Starks, Jr.
(74) Attorney, Agent, or Firm—Fish & Richardson P.C.

(57) ABSTRACT

A knowledge-based system enables one knowledge model to generate multiple presentations. A domain expert, thus, can build a hierarchical collection of "knowledge blocks" that fully characterize all aspects of a given domain. Separate presentations of the domain, targeted at different classes of users, can then be created by assembling the knowledge blocks onto web pages. If an aspect of the domain changes, the domain expert need only modify the knowledge blocks, and the presentations that use the modified knowledge blocks are thereby automatically updated. Thus, the user is insulated from the organization of the knowledge model.

31 Claims, 12 Drawing Sheets

Medical Plan Knowledge Model

| Major Category | Minor Category | Knowledge Blocks (IDs of selected blocks are in parentheses) |
|---|---|---|
| General description | General description | Medical insurance carrier, General description, ... |
| Eligibility | Employee eligibility | Eligibility rules, Waiting period, ... |
| | Dependent eligibility | Spouse definition, Spouse in the military, Company married couple, ... |
| | ... | |
| Cost | Contributions | Paying for coverage, When costs change, ... |
| | Tax impact | Before or after tax contributions, Effect of pre-tax premiums on paycheck, ... |
| | ... | |
| Benefits | Overview of benefits | Overview of benefits, ... |
| | Benefits coverage | Chiropractors, Cosmetic surgery, Hospice care, Infertility treatment, ... |
| | Using the network | Network of doctors and hospitals, Directory of providers, ... |
| | Maternity | Hospital charges, Coverage for midwives (MED_MIDWIFE_COVERAGE), ... |
| | ... | |
| Coordinating with other plans | Definitions | Coordination of benefits, ... |
| | Plans | Other group plans, Medicare, ... |
| Receiving benefits | Claim filing procedures | How to file a claim, Obtaining a claim form, ... |
| | Claim payment | Who gets the payment, ... |
| | ... | |
| Continuation of benefits | COBRA | Plan eligible for COBRA continuation, ... |
| | Conversion | Can I convert, Applying for conversion, ... |
| | ... | |

FIG. 1

I'm expecting a child – what do I need to know?

The company has many ways of helping you with your new family member. Here are some things to consider:

I'm considering using a Midwife for the delivery of the baby. Am I covered?
Aetna Health covers services of a midwife at 80%. First you have to pay Aetna Health's deductible, though.

I want to take some time off after the baby is delivered. Can I?
For the period of time that your doctor certifies you as medically unable to work, you receive paid time off under the company's Short Term Disability plan. After that, you have to use your vacation days. After you have used your vacation days, you are eligible for the company's Personal Leave policy. The Personal Leave policy allows you to take unpaid time off – up to 12 weeks. Although you are not paid during your time off, your job is protected during your leave, and your benefits are continued. You can call the HR department at x3045 to receive a Personal Leave Application form.

FIG. 2A

I want to go back to school for a while. What are my options?

The company has many ways of helping you develop your skills through education. Here are some things to consider:

Will the company pay for educational classes?
The company will pay for certain classes through the Tuition Reimbursement plan. The classes must be offered by an accredited institution. The classes must pertain to your job, and must lead to a degree or certification. You must maintain at least a B average to be reimbursed.

Can I take part time courses?
You can take courses outside of your normal working hours at any time. The company may pay for your course work, as described above.

Can I go back to school full time?
The company allows some employees to go back to school full time for one semester per calendar year. Your manager must approve your time off, and will only do so if he/she feels that the course work will greatly assist you in your current job. You have to use your vacation days for the first part of your leave. After you have used your vacation days, you are eligible for the company's Personal Leave policy. The Personal Leave policy allows you to take unpaid time off – up to 12 weeks. Although you are not paid during your time off, your job is protected during your leave, and your benefits are continued. You can call the HR department at x3045 to receive a Personal Leave Application form. The company may pay for your course work, as described above.

FIG. 2B

I'm expecting a child – what do I need to know?

The company has many ways of helping you with your new family member. Here are some things to consider:

I'm considering using a Midwife for the delivery of the baby. Am I covered?
Aetna Health covers services of a midwife at 80%. First you have to pay Aetna Health's deductible, though.

I want to take some time off after the baby is delivered. Can I?
For the period of time that your doctor certifies you as medically unable to work, you receive paid time off under the company's Short Term Disability plan. After that, you have to use your vacation days. After you have used your vacation days, you are eligible for the company's Personal Leave policy. The Personal Leave policy allows you to take unpaid time off – up to 16 weeks. Although you are not paid during your time off, your job is protected during your leave, and your benefits are continued, but you must pay the company to continue your medical plan. You can call the HR department at x3045 to receive a Personal Leave Application form.

FIG. 3A

I want to go back to school for a while. What are my options?

The company has many ways of helping you develop your skills through education. Here are some things to consider:

Will the company pay for educational classes?
The company will pay for certain classes through the Tuition Reimbursement plan. The classes must be offered by an accredited institution. The classes must pertain to your job, and must lead to a degree or certification. You must maintain at least a B average to be reimbursed.

Can I take part time courses?
You can take courses outside of your normal working hours at any time. The company may pay for your course work, as described above.

Can I go back to school full time?
The company allows some employees to go back to school full time for one semester per calendar year. Your manager must approve your time off, and will only do so if he/she feels that the course work will greatly assist you in your current job. You have to use your vacation days for the first part of your leave. After you have used your vacation days, you are eligible for the company's Personal Leave policy. The Personal Leave policy allows you to take unpaid time off – up to 16 weeks. Although you are not paid during your time off, your job is protected during your leave, and your benefits are continued, but you must pay the company to continue your medical plan. You can call the HR department at x3045 to receive a Personal Leave Application form. The company may pay for your course work, as described above.

FIG. 3B

```
<H1> I'm expecting a child – what do I need to know? </H1>

The company has many ways of helping you with your new family member. Here are some things to consider:

<H2> I'm considering using a Midwife for the delivery of the baby. Am I covered? </H2>
<KBINSERT ID="MED_MIDWIFE_COVERAGE">

<H2> I want to take some time off after the baby is delivered. Can I? </H2>
<KBINSERT ID="STD_COVERAGE"> After that, you have to use your <A HREF=kbref("VACATION_DAYS")> vacation days </A>. After you have used your vacation days, you are eligible for the company's <A HREF=kbref("PLV")> Personal Leave policy </A>.
<KBINSERT ID="PLV_SUMMARY">
```

FIG. 4A

<H1> I want to go back to school for a while. What are my options? </H1>

The company has many ways of helping you develop your skills through education. Here are some things to consider:

<H2> Will the company pay for educational classes? </H2>
The company will pay for certain classes through the <A HREF=kbref("TUI")> Tuition Reimbursement plan </A>. <KBINSERT ID="TUI_REQUIREMENTS">.

<H2> Can I take part time courses? </H2>
<KBINSERT ID="TUI_PARTTIME_ELIGIBILITY"> The company may pay for your course work, as described above.

<H2> Can I go back to school full time? </H2>
The company allows some employees to go back to school full time for one semester per calendar year. <KBINSERT ID="TUI_FULLTIME_ELIGIBILITY">. You have to use your <A HREF=kbref("VACATION_DAYS")> vacation days </A> for the first part of your leave After you have used your vacation days, you are eligible for the company's <A HREF=kbref("PLV")> Personal Leave policy </A> <KBINSERT ID="PLV_SUMMARY"> The company may pay for your course work, as described above.

FIG. 4B

Personal Leave Summary (Block ID is PLV_SUMMARY)

The PLV_plan_name allows you to take unpaid time off – up to PLV_max_weeks weeks.
IF PLV_job_protection EQUALS yes THEN
   Although you are not paid during your time off, your LINK "job is protected", PLV_job_protection ENDLINK during your
   leave
ELSE
   You are not paid during your time off. Also, you may not receive the same job when you come back from a personal leave
ENDIF
IF PLV_benefits_continued EQUALS yes THEN
   , and your LINK "benefits are continued", PLV_benefit_continuation ENDLINK
   IF PLV_employee_pays_medical_benefits EQUALS yes THEN
      , but you must pay the company to continue your medical plan.
   ELSE
      , and the company will pay for your medical plan.
   ENDIF
ELSE
   . The company does not provide medical coverage to you while you are on a personal leave.
ENDIF
You can call PLV_form_contact_name at PLV_form_contact_phone to receive a PLV_form_name.

FIG. 5

Medical Plan Knowledge Model

| Major Category | Minor Category | Knowledge Blocks (IDs of selected blocks are in parentheses) |
|---|---|---|
| General description | General description | Medical insurance carrier, General description, ... |
| Eligibility | Employee eligibility | Eligibility rules, Waiting period, ... |
| | Dependent eligibility | Spouse definition, Spouse in the military, Company married couple, ... |
| | ... | |
| Cost | Contributions | Paying for coverage, When costs change, ... |
| | Tax impact | Before or after tax contributions, Effect of pre-tax premiums on paycheck, ... |
| | ... | |
| Benefits | Overview of benefits | Overview of benefits, ... |
| | Benefits coverage | Chiropractors, Cosmetic surgery, Hospice care, Infertility treatment, ... |
| | Using the network | Network of doctors and hospitals, Directory of providers, ... |
| | Maternity | Hospital charges, Coverage for midwives (MED_MIDWIFE_COVERAGE), ... |
| | ... | |
| Coordinating with other plans | Definitions | Coordination of benefits, ... |
| | Plans | Other group plans, Medicare, ... |
| | ... | |
| Receiving benefits | Claim filing procedures | How to file a claim, Obtaining a claim form, ... |
| | Claim payment | Who gets the payment, ... |
| Continuation of benefits | COBRA | Plan eligible for COBRA continuation, ... |
| | Conversion | Can I convert, Applying for conversion, ... |
| | ... | |

FIG. 6A

Tuition Reimbursement Plan Knowledge Model

| Major Category | Minor Category | Knowledge Blocks |
|---|---|---|
| Overview | | General description, Quick view, Administrator, .... |
| | ... | |
| Eligibility | Eligibility | Full-time eligibility (TUI_FULLTIME_ELIGIBILITY), Part-time eligibility (TUI_PARTTIME_ELIGIBILITY), Program requirements (TUI_REQUIREMENTS), Waiting period, .... |
| | ... | |
| Provisions | Benefit | Benefit amount, Books, Fees, .... |
| | Limits | Maximum benefit, Exclusions, ... |
| | Courses | Course grade, Course job related, ... |
| | Schools | Types of schools, School lists, ... |
| | ... | |
| Procedures | Procedures | Advanced payments, Approval, How to apply, .... |
| ... | | |

FIG. 6B

Personal Leave Policy Knowledge Model

| Major Category | Minor Category | Knowledge Blocks |
|---|---|---|
| General description | General description | General description, Summary (PLV_SUMMARY), Quick view, ... |
| | ... | |
| Who the policy applies to | Who the policy applies to | Eligible employees, Waiting period, ... |
| | ... | |
| About the policy | Qualifications<br>Pay<br>Job security<br>Benefits<br>Extensions<br>Paid time off | Reasons for taking a leave, ...<br>Income while on a personal leave, ...<br>Position upon return, ...<br>Benefits while on leave, ...<br>Extending a leave, ...<br>Paid time off while on leave, ... |
| | ... | |
| Process | Process | Returning to work, Taking a personal leave, ... |
| ... | | |

FIG. 6C

| Variable | Plan/Policy | Employee Group | Effective Date | Value |
|---|---|---|---|---|
| PLV_plan_name | Company Personal Leave Policy | ALL | 1/1/99 | Personal Leave policy |
| PLV_max_weeks | Company Personal Leave Policy | ALL | 1/1/99<br>1/6/99 | 12<br>16 |
| PLV_job_protection | Company Personal Leave Policy | Full-time<br>Part-time | 1/1/99<br>1/1/99 | yes<br>no |
| PLV_benefits_continued | Company Personal Leave Policy | ALL | 1/1/99 | yes |
| PLV_employee_pays_medical_benefits | Company Personal Leave Policy | ALL | 1/1/99<br>1/6/99 | no<br>yes |
| PLV_form_contact_name | Company Personal Leave Policy | ALL | 1/1/99 | the HR department |
| PLV_form_contact_phone | Company Personal Leave Policy | ALL | 1/1/99 | x3045 |
| PLV_form_name | Company Personal Leave Policy | ALL | 1/1/99 | Personal Leave Application form |

FIG. 7

KNOWLEDGE SYSTEM WITH DISTINCT PRESENTATION AND MODEL STRUCTURE

The present invention relates to a knowledge-based system having an architecture that separates the presentation of information from its organization in the system.

BACKGROUND OF THE INVENTION

Knowledge-based systems, also known as "expert" systems, are typically application programs that make decisions or solve problems in a particular subject area, referred to as a "knowledge domain," by using knowledge and analytical tools defined by experts in the field. By their very nature, expert systems are knowledge-intensive due to the goal of modeling human expertise in a domain. Such systems usually comprise two components: a knowledge base containing the information necessary to answer questions relevant to the domain and an inference engine to formulate answers to these questions, also known as "queries," based on the information contained in the knowledge base. Also, a user interface typically is provided to receive the queries from either a user or another application program, to submit these queries to the inference engine, and then to provide responses back to the user or other application program.

Knowledge-based systems have been used in such diverse knowledge domains as engineering, the sciences, medicine, and business. Similar to numerical computer systems, they model situations and solve problems. However, and most importantly, knowledge-based systems also provide representation and reasoning capabilities that are not possible with most numerical methods. One specific example of this additional capability concerns the modeling of the knowledge possessed by human resource professionals in institutions, such as government agencies or commercial companies.

Human Resource (HR) departments currently use many systems to answer employee and managerial questions about employee benefit plans and HR policies, procedures, and practices. These questions include how to: use medical plans, take leaves of absence, and file harassment complaints, as well as other questions regarding, e.g., paycheck amounts.

The information sources used to answer these questions in the typical organization usually reside in various formal and informal repositories. Some sources are static documents, both paper and electronic. These documents, which may or may not have been generated by the department, are designed to answer questions posed by employees. Other information sources include dynamic databases, such as the human resource management systems (HRMS's) that contain accounting information for each employee. Finally, some information resides only in the heads of the experienced HR professionals in the organization. These various and unconnected systems are the basis of most companies' HR information dissemination processes today, but there are problems with the underlying model for information dissemination.

First, pre-prepared, static documents are costly to produce. These document types include manually maintained policy manuals, summary plan descriptions, and web sites. Second, these document types tend quickly to become dated, especially during major system or corporate reorganizations. Also, these resources often are able only to give general answers because many of the detailed answers vary depending on the particular employee's situation, eg., employee group, physical location, age, and length of employment.

In contrast, HRMSSs, which are sometimes part of even larger enterprise resource planning systems (ERPs), contain vast quantities of accurate, constantly-updated data.

These dynamic systems, however, do not contain information such as HR policies or on how to submit forms. Thus, HRMSs tend to be able to answer very specific questions (e.g., what is the net amount on my monthly paycheck), but not general ones (e.g., I'm having a baby, what does the company do for me and what must I do to use these benefits).

Other systems, such as electronic collections of answers to questions previously asked by other employees, are easy to search, but require significant resources to prepare and still pose the same problems of prepared documents. These systems are also more likely to yield incorrect answers due to changes in policies or organization that would render previously correct answers incorrect. Not only is it tedious and difficult to identify and correct all of the affected answers following a change in policies or organization, it is even harder to verify that the changed answers are correct and complete. It quickly becomes apparent that such systems do not adequately address the deficiencies of other systems or satisfy the requirements of a useful information resource.

Finally, although HR professionals themselves can be used to answer questions, this resource is both expensive and inefficient. Using HR professionals to constantly answer repetitive questions, instead of working on more strategic initiatives, is not the best application of their skills and may result in the loss of talented HR professionals from the organization. In addition, finding the right knowledgeable person to answer a question can be a frustrating and slow process for an employee. Furthermore, such resources may not be accessed by other applications. Thus, relying on HR personnel to provide employee information is not a viable option for any but the smallest of organizations.

Consequently, knowledge modeling and delivery systems have evolved that combine pre-configured, parameterized models of human resource knowledge with organization and employee data. Such expert systems have successfully delivered personalized answers to employee and manager questions about benefit plans, payroll, HR policies, procedures, and practices using expert system inferencing techniques.

However, in the advancement of knowledge systems generally, most of the effort has been directed to improving knowledge modeling and inferencing techniques to improve reliability and the value of the information they provide to the user. Unfortunately, because of the limited commercial viability of these techniques thus far, insufficient effort has been expended to improve the delivery of information generated by the knowledge system to the user. However, if such knowledge-based systems are ever to be deployed more generally, issues such as information presentation move to the forefront.

In the past, knowledge-based systems have generally employed one or two means to present the information drawn by the inferencing engine from the knowledge base. Most commonly, presentation of the information is dependent on how the knowledge in the knowledge base is organized. Domain experts mentally inevitably organize their knowledge differently from how various potential users might like to retrieve it. Thus, the domain experts often design and build a knowledge model of a domain that matches their mental organization of the domain, while different users of the model want to see the information contained in the model using different organizations. The typical solution—providing general and technical levels of responses—does not adequately meet anyone's information needs in most situations.

Recently, however, efforts have been focused on separating how the information is displayed from how it is stored in the knowledge base in order to present the same information in a variety of ways. However, improvements still can be made in how information is presented to the user. Problems continue to arise due to the fact that a given user's needs may vary based on the nature of the information required.

Returning to the specific example of expert systems that address HR-related questions, it is not uncommon for an HR functional expert to create a presentation, such as a Web site or manual, that describes a particular policy or benefit plan. While the information presented seems to be complete and correct to the HR functional expert, when the presentation is referenced by an employee with a specific problem or question regarding the plan or policy, the information is often very difficult to digest. The information may be perceived by the employee as being overly technical and the answer, which the employee requires, may appear to be buried beneath other information that is irrelevant to the employee and/or fragmented into more than one location. Thus, not only is the employee frustrated by the significant effort required to obtain the correct information, it can never be determined with certainty that all of the relevant information has been retrieved.

Moreover, other problems arise due to differences in the experience levels of the various users that a system must accommodate. Some users know so little about the subject area that they fail to comprehend a given presentation, whereas other users, who may have had a great deal of experience in the knowledge domain, sometimes experience frustration in finding the "nuts and bolts" facts and details that they require.

Considering the example of an expert system that models the benefits offered by a medical plan, the same presentation cannot be used for an employee, a doctor's office, and a medical plan designer because their respective needs are so disparate. Yet, if multiple presentations are built for all possible users, it is burdensome to keep them all current when changes to the knowledge base occur. Also, when an employee has a life event like marriage or childbirth, many pieces of information from many plans and policies need to be compiled to answer the employee's questions.

SUMMARY OF THE INVENTION

Accordingly, it is an object of the present invention to provide a knowledge-based system that overcomes the deficiencies of currently available information systems.

It is an additional object of the present invention to provide a knowledge-based system having an architecture that separates the presentation of information from its organization in the system in order to provide multiple types of presentations of the same information.

It is a further object of the present invention to provide a knowledge-based system in which changes to the knowledge base are automatically reflected in the answers to specific queries.

In its most general aspect, the present invention is directed to a knowledge-based information dissemination system that enables a single knowledge model to generate multiple presentations of the identical information. This system comprises a knowledge model, which has content, referred to as "knowledge blocks," that are organized to facilitate content authoring. E.g., the knowledge blocks might be organized in a fashion that corresponds to a domain expert's understanding of the relevant domain. These knowledge blocks enable the system to appropriately identify and locate the correct information that a user is seeking. In addition to the knowledge blocks, the knowledge model comprises identification of certain variables that are referenced by the knowledge blocks, and data collection screen definitions that prompt a content author during creation and implementation of the knowledge model.

A presentation template repository is provided, which has presentation templates. These templates are organized in a manner designed to best convey information to different classes of system users operating in different organizational contexts. According to the invention, different presentation templates may incorporate the same knowledge blocks. In this way, the same information from the knowledge model could be presented differently to answer different questions or address different levels of user sophistication. Finally, a compiler is used to deliver the presentation to the users by combining the presentation templates with the knowledge blocks.

Thus, a domain expert can build a hierarchical collection of knowledge or knowledge blocks that fully characterize a given domain and not limit the possible ways in which that knowledge may be presented. Various presentations of the information, targeted at different classes of users, may be created by assembling the knowledge blocks into different presentations. If an aspect of the knowledge model changes, the domain expert need only modify the knowledge blocks, and the presentations that draw information from the modified knowledge blocks are thereby automatically updated.

In one embodiment, the knowledge blocks are hierarchically organized within the knowledge model. One currently employed organization uses a combination of major and minor categories. These knowledge blocks may use a plurality of rules, text, and variable references to organize the information that they contain. In other aspects of this embodiment, an information repository is used that has variable assignments. Typically, these variable assignments correspond to different instantiations of the knowledge model, e.g., differently modeled health benefit plans. The knowledge blocks then comprise variables, the values of which are defined by the variable assignments in the information repository. The variable assignments, in turn, are determined by the organizational context of each employee, i.e., the healthcare plan in which the employee is enrolled, the number of vacation and days that he has earned and used, etc. This contextual information may be typically found in the company's HRMS.

In one implementation, the system of the present invention is used to disseminate human resource information. The information repository may comprise employee group-specific information, e.g., the benefits offered to both hourly or salaried employees. Other repositories, such as HRMSs, may be also be accessed to provide information, or variable assignments, that are specific to individual employees.

In addition, the presentation templates may be formatted in a mark-up language derived from SGML. Examples of such languages include HTML and XML. The user views the presentations through a client-browser. Alternatively, another application program can access the system of the present invention, with the presentations being transferred to the application system for display, either directly or indirectly.

In general, according to another aspect, the system of the present invention contemplates a method for providing information. This method may comprise the step of accessing a presentation repository to identify and select the presentation template that is most responsive to a request for information. This request for information can come from another application program, or directly from a user, e.g., via a browser. Content may then be incorporated into the selected presentation template by the compiler based on the knowledge blocks referenced by the presentation.

Information from disparate knowledge blocks in the knowledge model may be incorporated into the same presentation template. E.g, in the specific example of a human resource information dissemination system, a presentation template covering benefits associated with childbirth may include the company's leave policy and the benefits offered by the employee's selected medical plan. Regardless, however, of the specific information identified, the selected presentation template is displayed to the user with the incorporated content.

The above and other features of the invention, including various novel details of construction and combinations of parts, and other advantages will now be more particularly described with reference to the accompanying drawings and pointed out in the claims. It will be understood that the particular method and device embodying the invention are shown by way of illustration only and not as a limitation of the invention.

The principles and features of this invention may be employed in various and numerous embodiments without departing from the scope of the invention.

BRIEF DESCRIPTION OF THE DRAWINGS

In the drawings, like reference characters refer to the same parts throughout the different views. Of the drawings:

FIGS. 3A and 3B illustrate the two exemplary presentations of FIGS. 2A and 2B after modification of the underlying shared knowledge blocks;

DETAILED DESCRIPTION OF EMBODIMENTS

Figure 1:
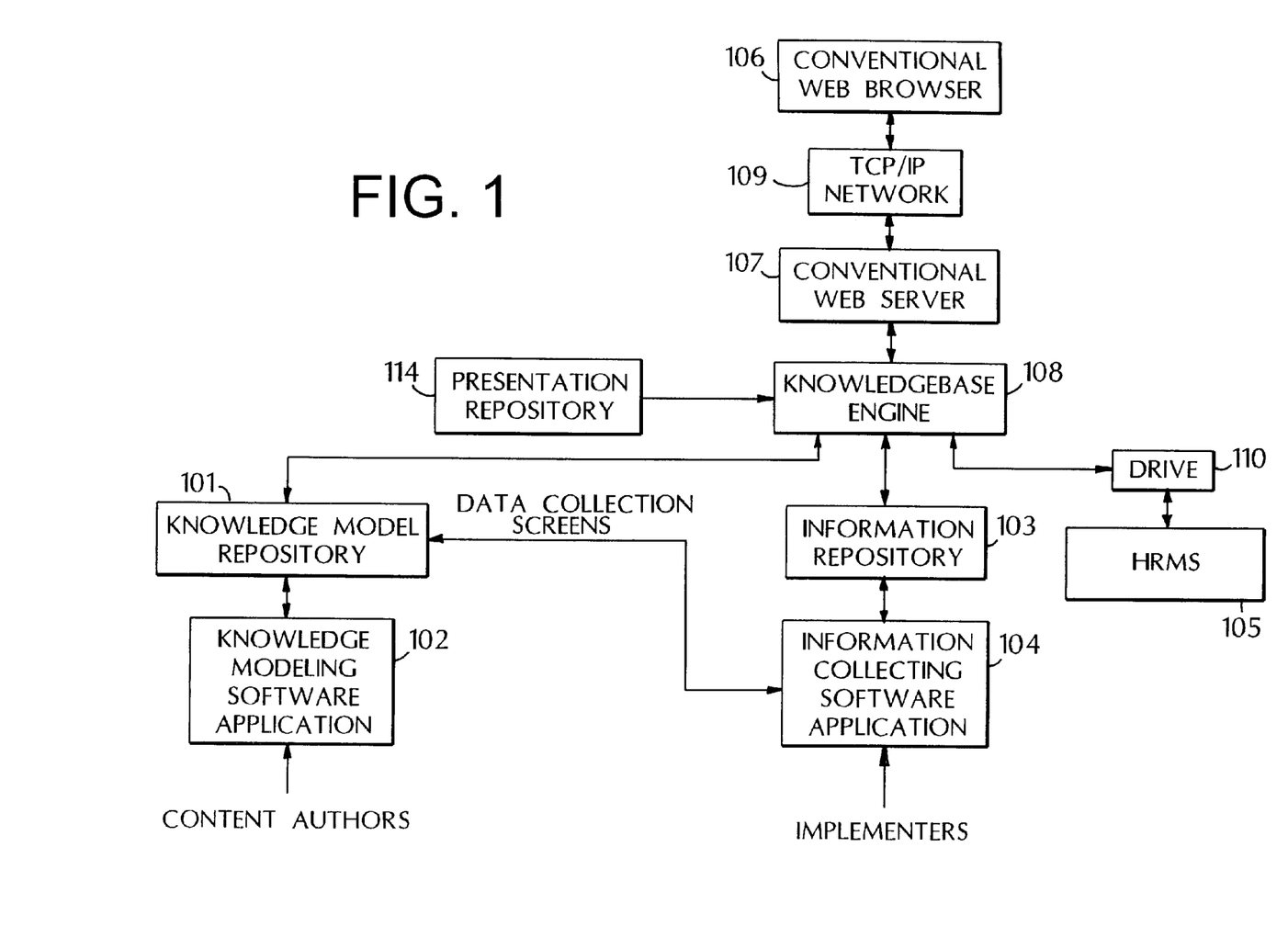
FIG. 1 shows a block diagram showing the organization of a knowledge-based employee benefit information system according to the present invention.

Turning now to the drawings, FIG. 1 shows a knowledge-based information system that has been constructed according to the principles of the present invention.

While the following discussion is specific to a system which provides human resource-related information such as health plan benefits, tuition reimbursement plans, and personal leave policies, the principles of the present invention have wider applicability to such diverse fields as financial systems, enterprise management systems, supply-chain systems, insurance systems, corporate sales, manufacturing processes, and technical systems, to list a few examples, as is common with many expert systems.

In a preferred embodiment, information is sent to the entity making the query using a combination of a conventional browser 106 and a conventional web server 107. In such an example, the server 107 and browser 106 communicate via a TCP/IP network 109. Such a system has certain advantages in that established platforms and tools are readily available. In other implementations, however, proprietary interfaces could be used over public and/or private networks.

Moreover, in still other implementations, the knowledge system provides information to another application program, such as other human resource or enterprise management systems, which have their own proprietary interfaces and displays. In such situations, the knowledge engine interfaces with the other application program via, in one case, standard application programming interfaces (APIs).

In the present embodiment, the querying entity may be an employee seeking to answer personal questions concerning, e.g., his benefits or a manager seeking to answer such questions concerning the employees in her department. Alternatively, this system may also be deployed to enable HR professionals to generate queries and obtain answers in response to questions from employees seeking the information, e.g., in a call-center environment. In still other applications, the system may be invoked during a plan selection process by an employee to provide information to assist the employee with the plan selection decision.

A knowledge engine or compiler 108 dynamically generates the HTML (Hyper-Text Markup Language) pages that are provided by the web server 107. These web pages are generated by referencing the relevant section of the knowledge model repository 101 and inserting information from the organization-specific and group-specific information repository 103 and HRMS 105 that functions as the employee-specific information repository.

In one embodiment, the compiled information from the knowledge model repository 101, organization-specific information repository 103, and the HRMS 105 is then incorporated into HTML template pages contained in a presentation repository 114. The resulting complete pages are provided by the web server 107 to browser 106. In other embodiments, the responses are interfaced with other applications and/or processes rather than directly with users. E.g., information can be transferred to a case-management or claims-processing system.

The knowledge model repository 101 contains the various knowledge models created using knowledge modeling software application 102. In one embodiment, these models are implemented either in an object-oriented or relational database system. Knowledge model repository 101 typically contains separate knowledge models for multiple plans, such as benefit plans for both hourly-workers and for salaried workers. The model for each of these plans, however, may be hierarchically-organized.

The knowledge modeling software application 102 is a tool that is used to generate the knowledge models contained in knowledge model repository 101. This system tracks variable assignments and their location in the organizational and HRMS repositories. It also provides template rule organization tools for building the sequenced data entry screens that are used during system implementation for creating variable assignments.

Figure 2A:
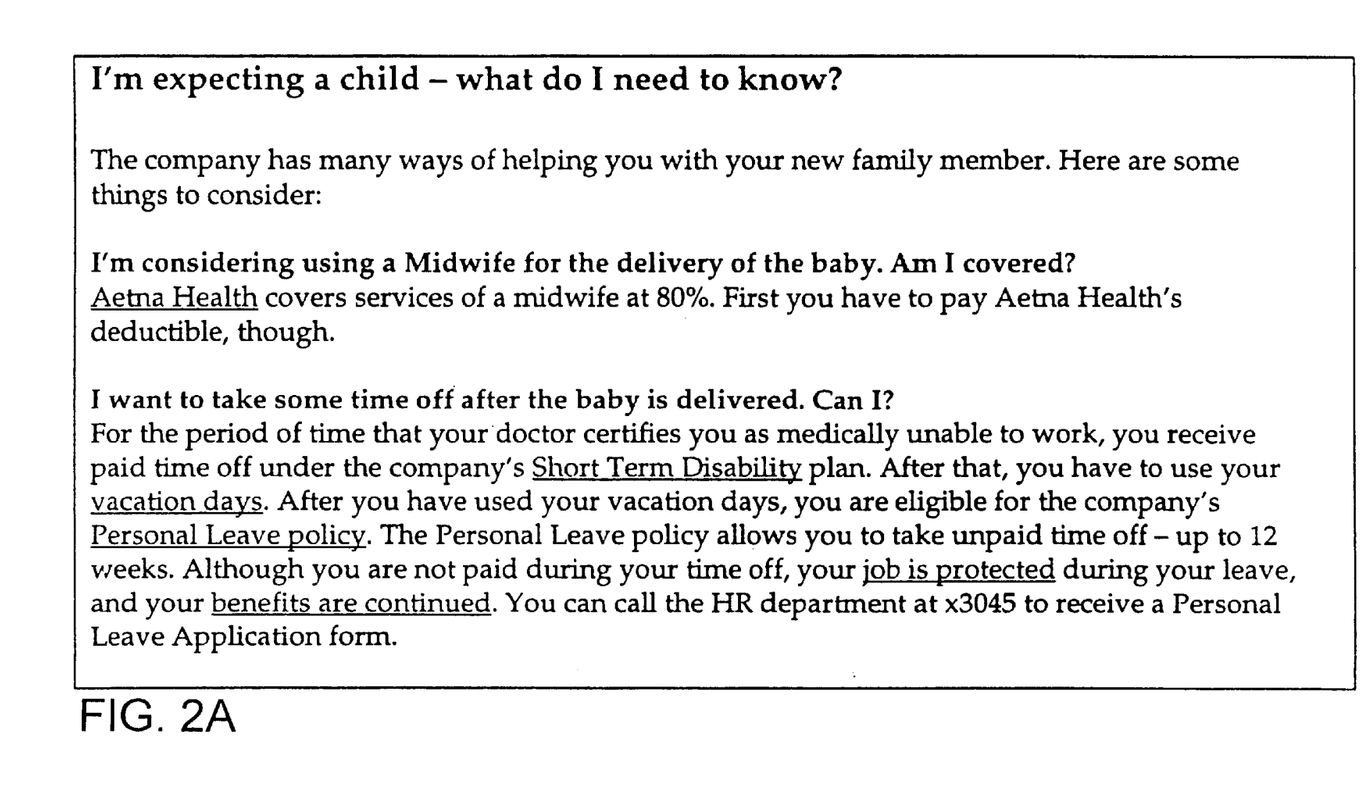
FIGS. 2A and 2B illustrate two exemplary presentations, one for an employee expecting a child and one for a manager with an employee who wants to take a semester of full-time classes at a local college, respectively.
Figure 2B:
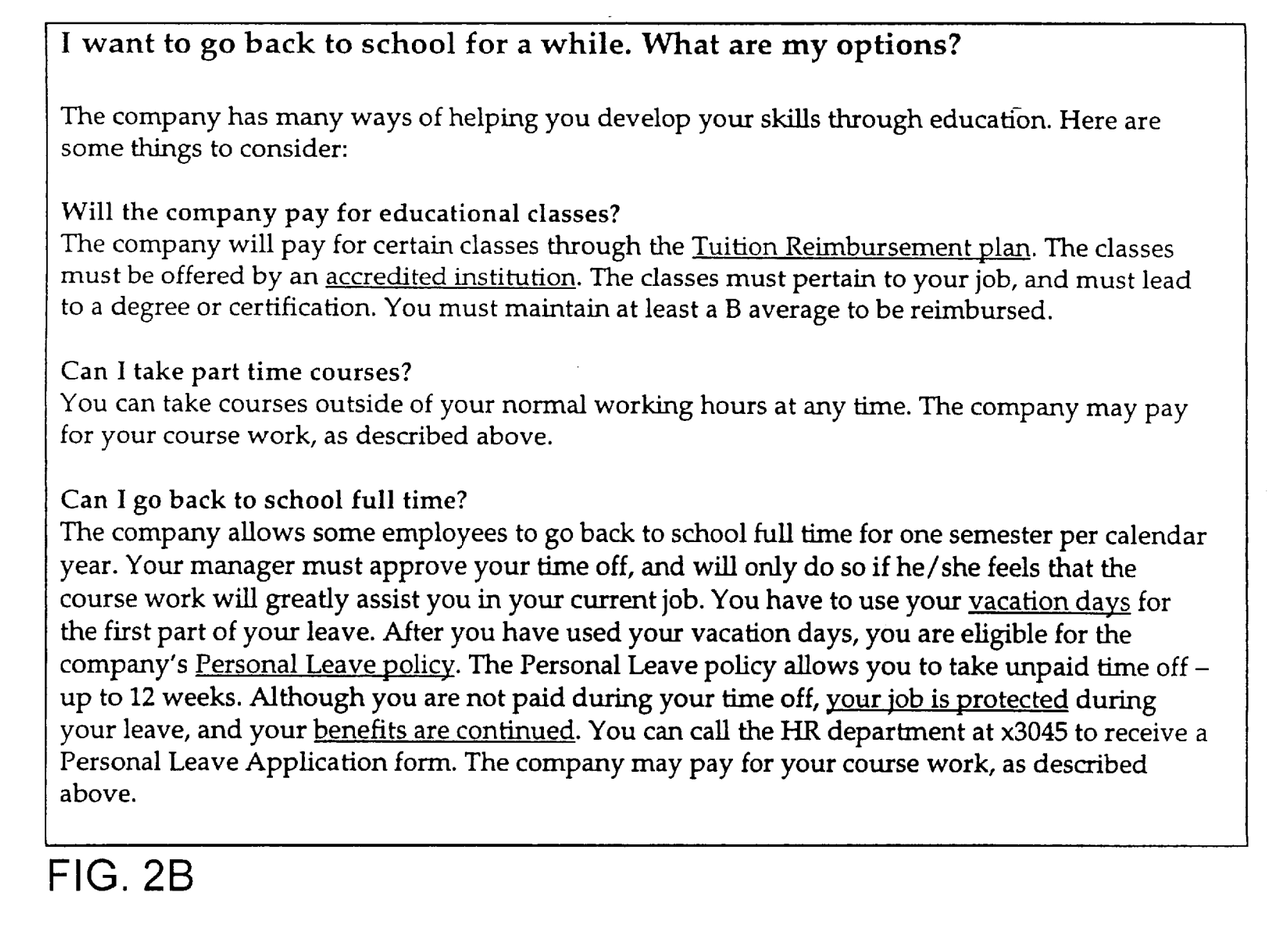

The organizational information collection software application 104 is a tool used by an HR system manager to accumulate information specific to the organization in the organization-specific information repository 103. In one embodiment, this organizational information collection software application 104 successively prompts the system manager to enter the information required by the system. The serial questions posed by the prompts are generated by accessing the associated variable prompts that are stored in the knowledge model repository 101. This process creates the various instantiations of the knowledge models, such as models of the specific medical plans covered by the system FIGS. 2A and 2B show two exemplary presentations generated by knowledge base engine 108 and supplied by server 107 to the user via web browser 106. In the example presentation of FIG. 2A, information is provided to a user who is or may be expecting a child. Specifically, the presentation provides answers concerning the level of coverage for delivery by a midwife. The presentation also answers the question concerning how much maternity leave is available to the employee after the baby is delivered. Specifically, the presentation outlines the various options of using short term disability, vacation days, and personal leave. It also outlines available health benefits. The presentation of FIG. 2B concerns the organization's education policy. Specifically, it answers whether or not the company will pay for education classes, whether part-time courses can be taken, and what occurs if the employee wants to go to school full-time.

As illustrated by the exemplary presentations of FIGS. 2A and 2B, rather than being organized in a manner in which a domain expert might view the underlying issues, the information instead is organized for the user with information from disparate portions of the knowledge model being combined in a single presentation. E.g., when advising a user as to issues surrounding having a child, information concerning health plan coverage is combined with the company's leave policy. Similarly, with respect to FIG. 2B, issues concerning education reimbursement are combined with vacation, personal leave, and benefits issues.

Figure 3A:
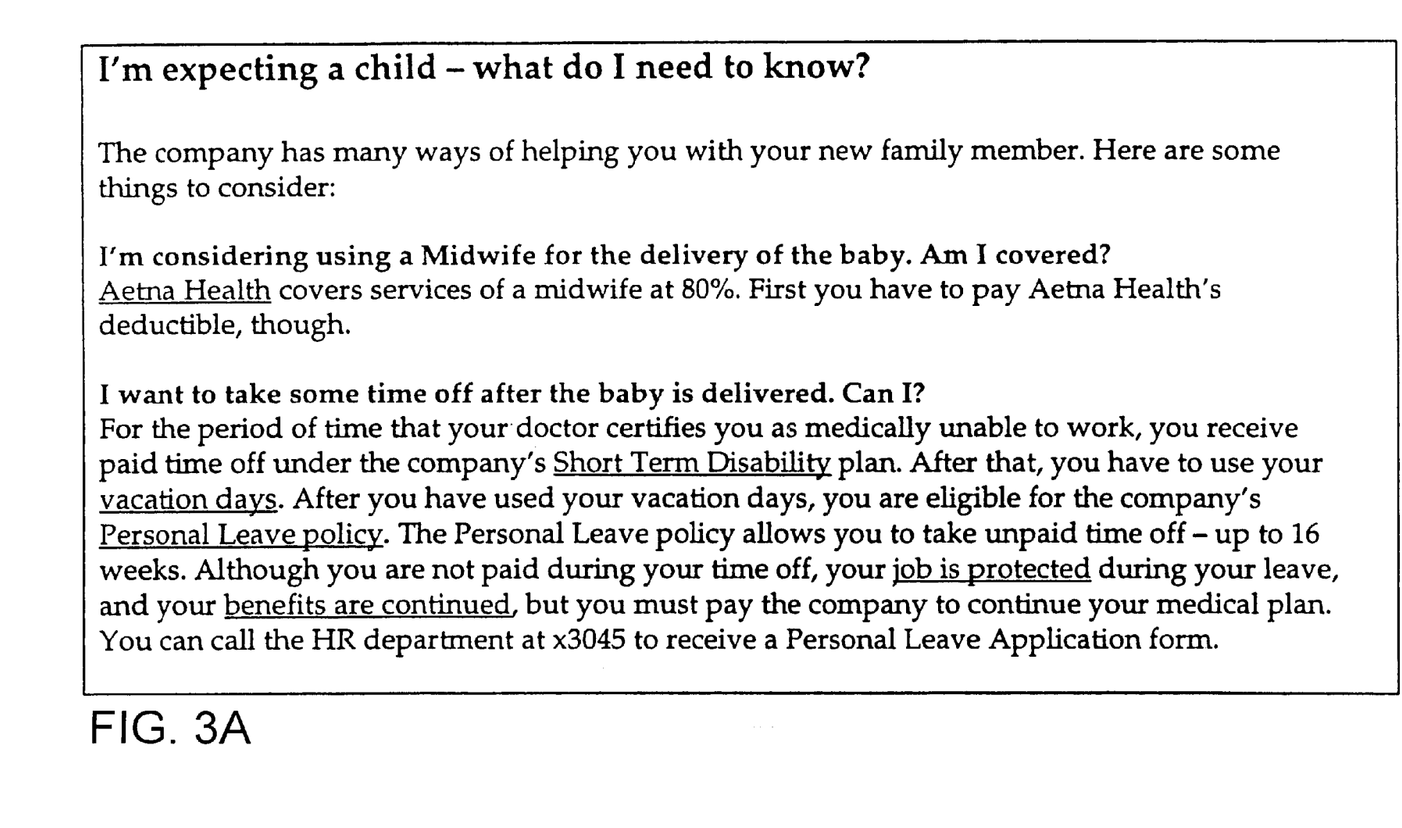

In addition to presenting the information in a fashion that is useful to a given system user, all various possible presentations are updated automatically when changes are made to the underlying knowledge model and information repository. FIGS. 3A and 3B illustrate the effect that changes to the knowledge model 101 and information repository 103 have on the presentations. Specifically, as illustrated in FIG. 3A, e.g., the personal leave policy provides up to sixteen weeks of unpaid time off in contrast to the twelve weeks described in the presentation of FIG. 2A under the personal leave policy. Further, under the formulation shown in FIG. 3A, the employee must pay the company to continue on the medical plan. In FIG. 3B, the benefits coverage is changed from that described in FIG. 2B.

Figure 4A:
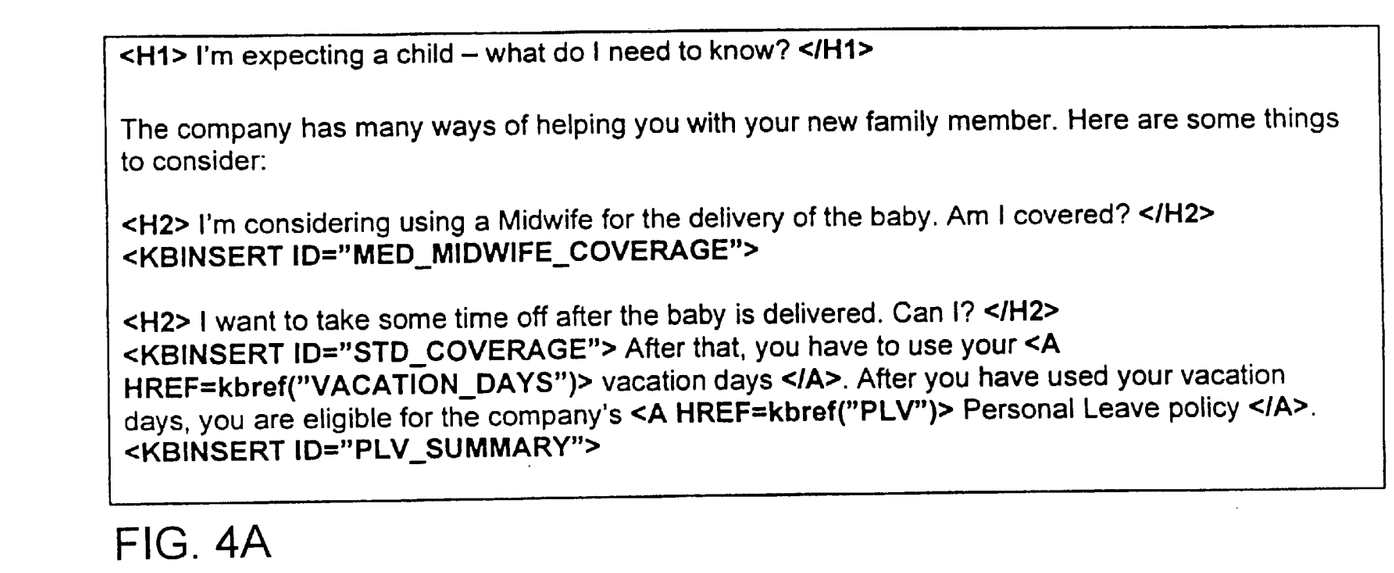
FIGS. 4A and 4B show two exemplary presentation templates for the examples of FIGS. 2A–3B.
Figure 4B:
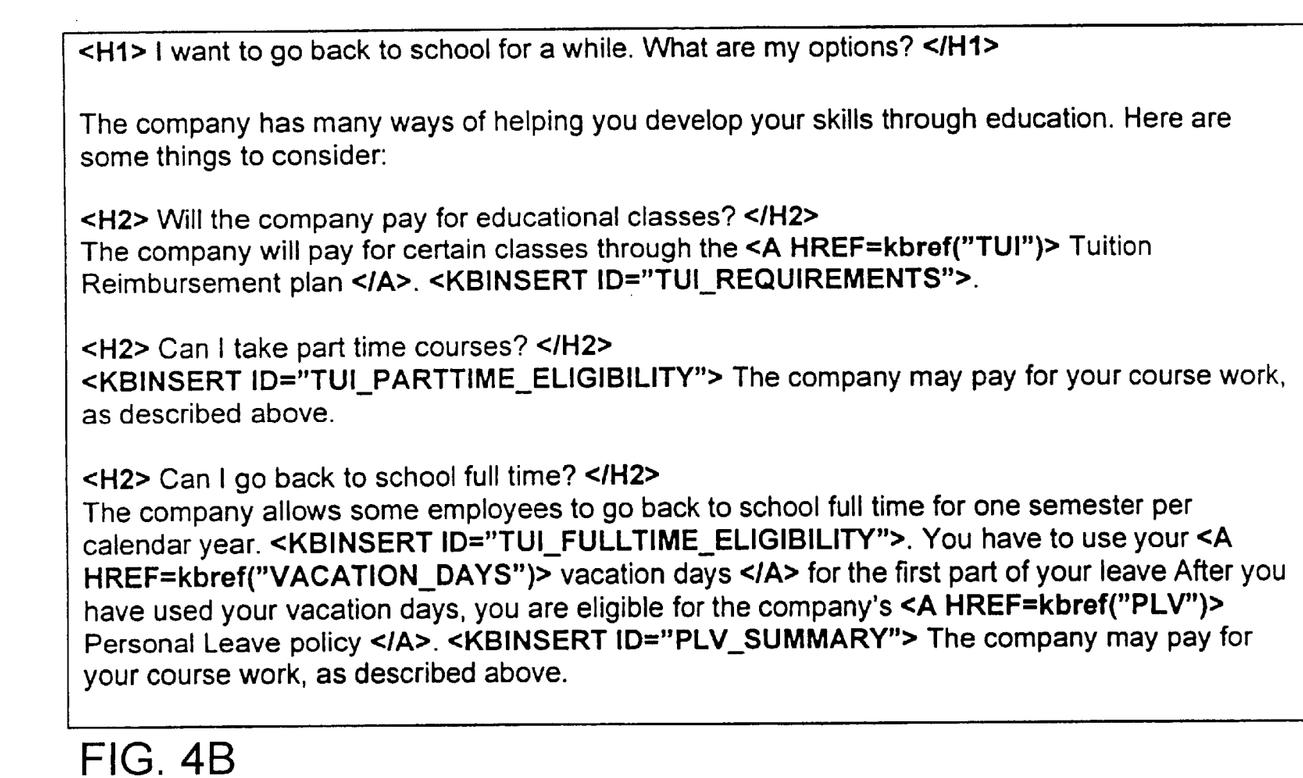

FIGS. 4A and 4B show the structure of the presentation templates that allows the automatic update of dynamic information without changes to the presentation templates. Specifically, headings or subject lines and generic text are formatted in the presentation templates as HTML text. References, however, are made to various knowledge blocks. E.g., the code <KBINSERT ID="MED_MIDWIFE_COVERAGE"> is a reference to a knowledge block contained in the knowledge model 101 that concerns coverage for deliveries by a midwife. Further, the code <KBINSERT ID="PLV_SUMMARY"> is a reference to the knowledge block concerning the personal leave policy summary. During compiling, the knowledge base engine 108 accesses the appropriate presentation template from the presentation repository 114 and combines the relevant knowledge blocks from the knowledge model repository 101.

Figure 5:
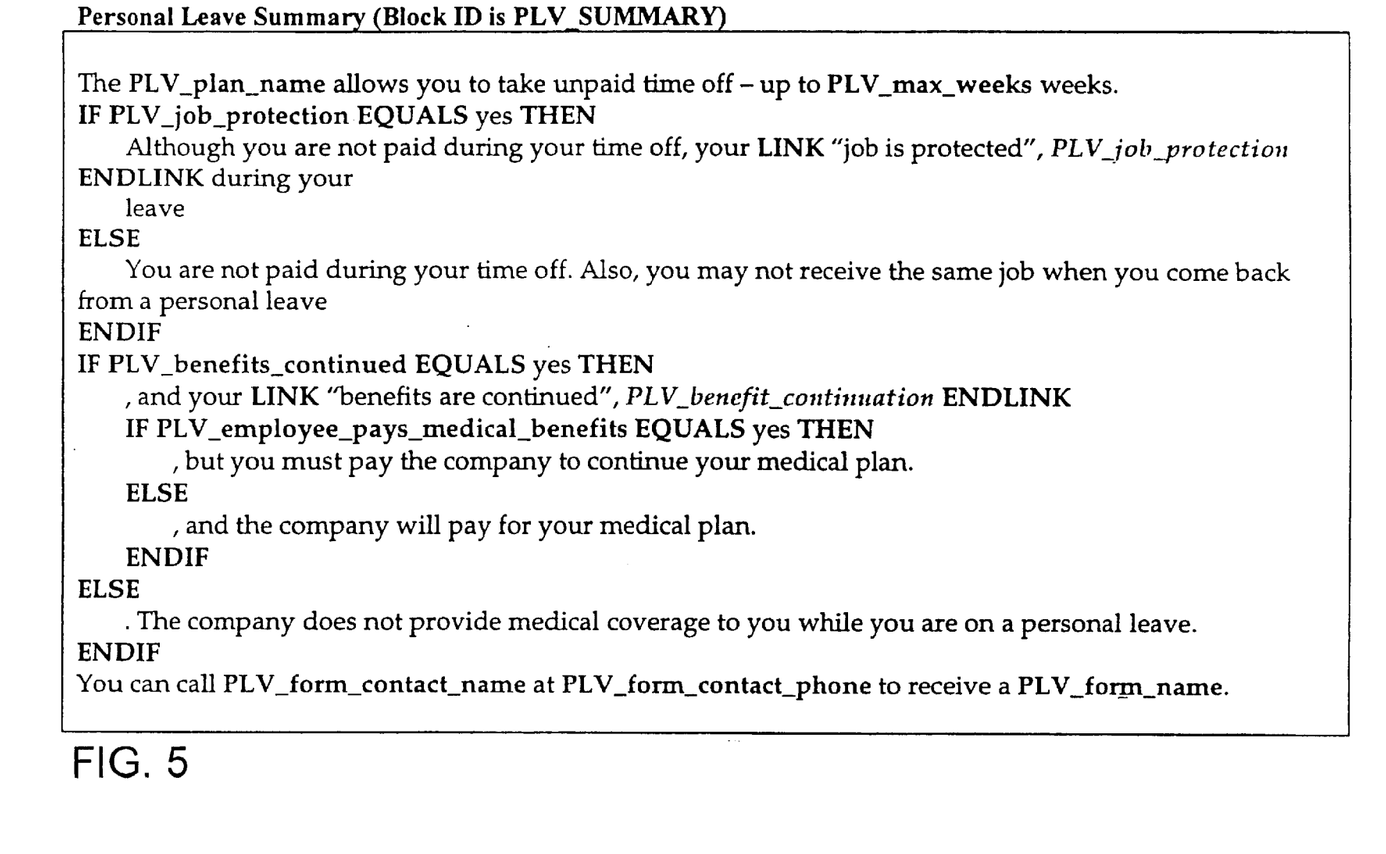
FIG. 5 shows an exemplary knowledge block from a personal leave policy model.

FIG. 5 shows an exemplary knowledge block. Specifically, rules, text, and variable references are used in the present implementation of the knowledge model. Statements are used to construct the knowledge block text blocks that are inserted into the presentation templates. In the illustrated example, the Personal Leave Summary, which has a block ID of PLV_SUMMARY, has both interpretive logic, in which, in a specific example, text is generated through "if-then-else" statements, and also strict substitution, where variables are located and replaced with variable assignments from the information repository 103.

It is important to note the separation between the presentation templates and the way that the knowledge blocks are organized in the knowledge model. E.g., FIGS. 2A and 2B (and also 3A and 3B) show different presentations that relate to the same company Personal Leave policy. Despite the different presentations, this Personal Leave policy references the same knowledge blocks in the knowledge model, as embodied in the knowledge block shown in FIG. 5. In this way, the presentation may be organized for the user's ease of access, while the knowledge model may be organized for content authoring by a domain expert.

Figure 6A:
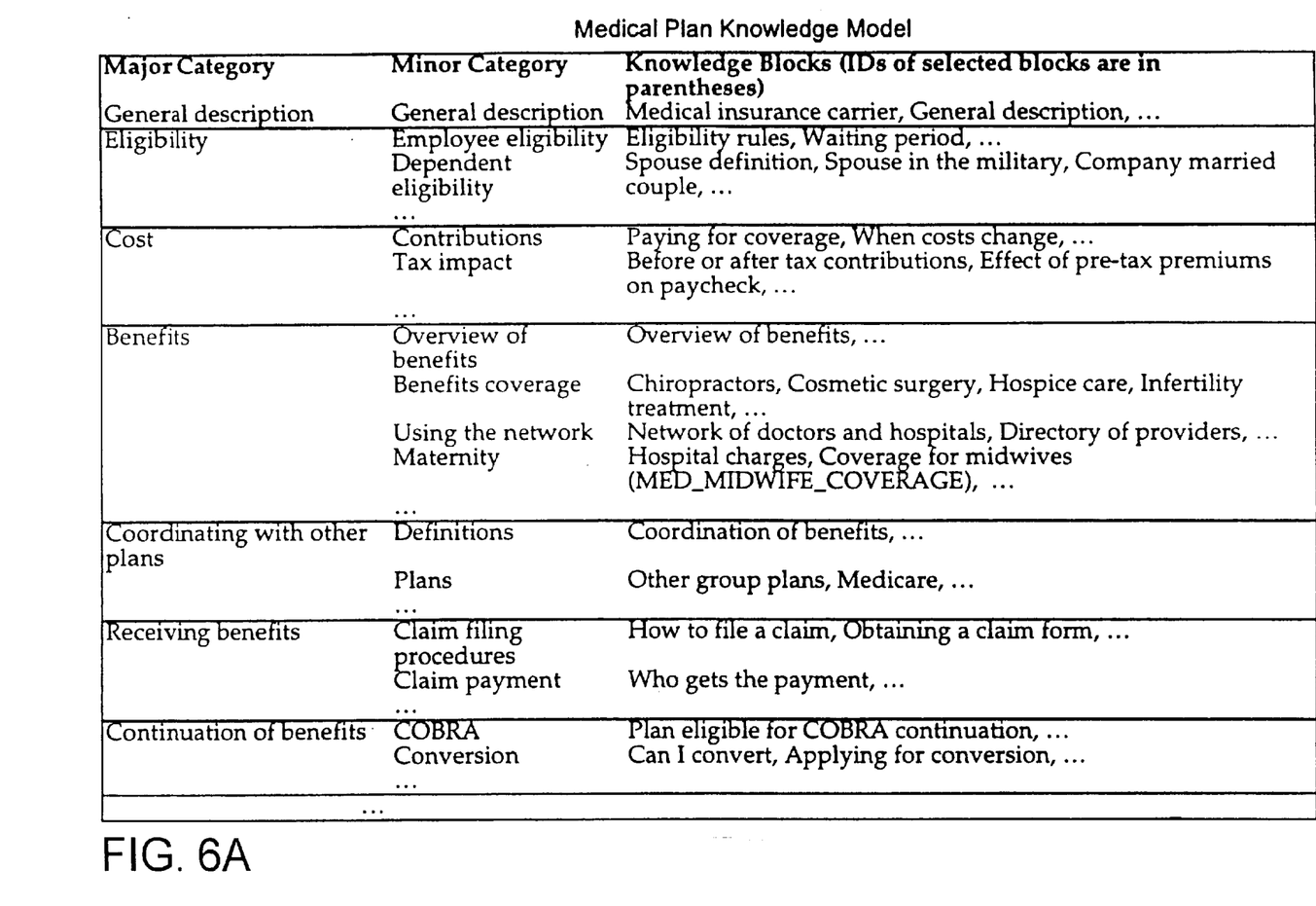
FIGS. 6A–6C show various knowledge models organized for content authoring.
Figure 6B:
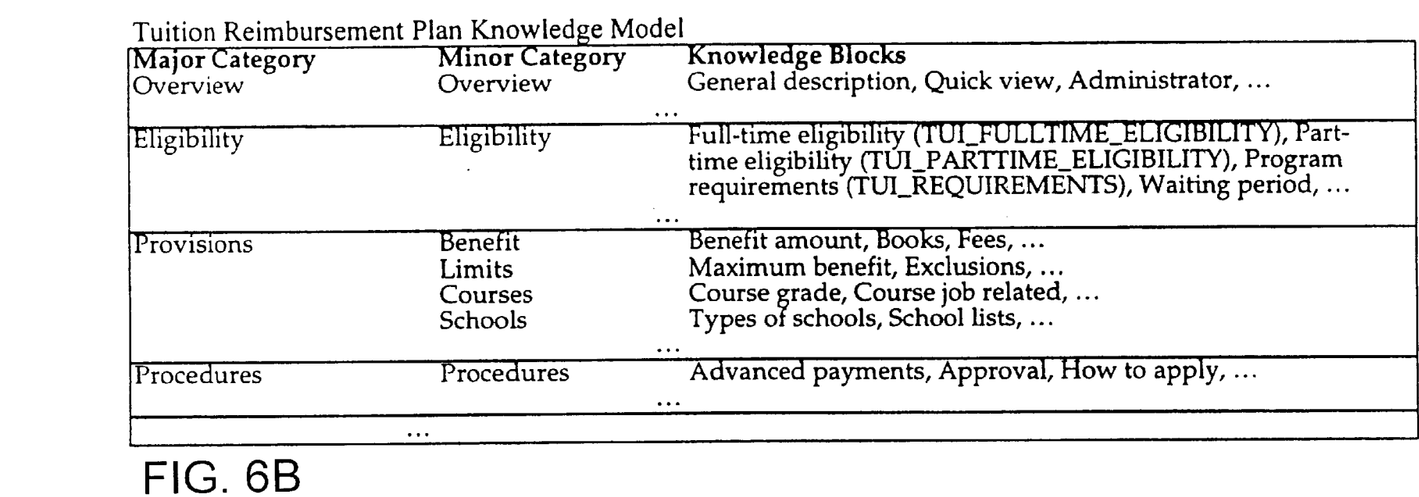
Figure 6C:
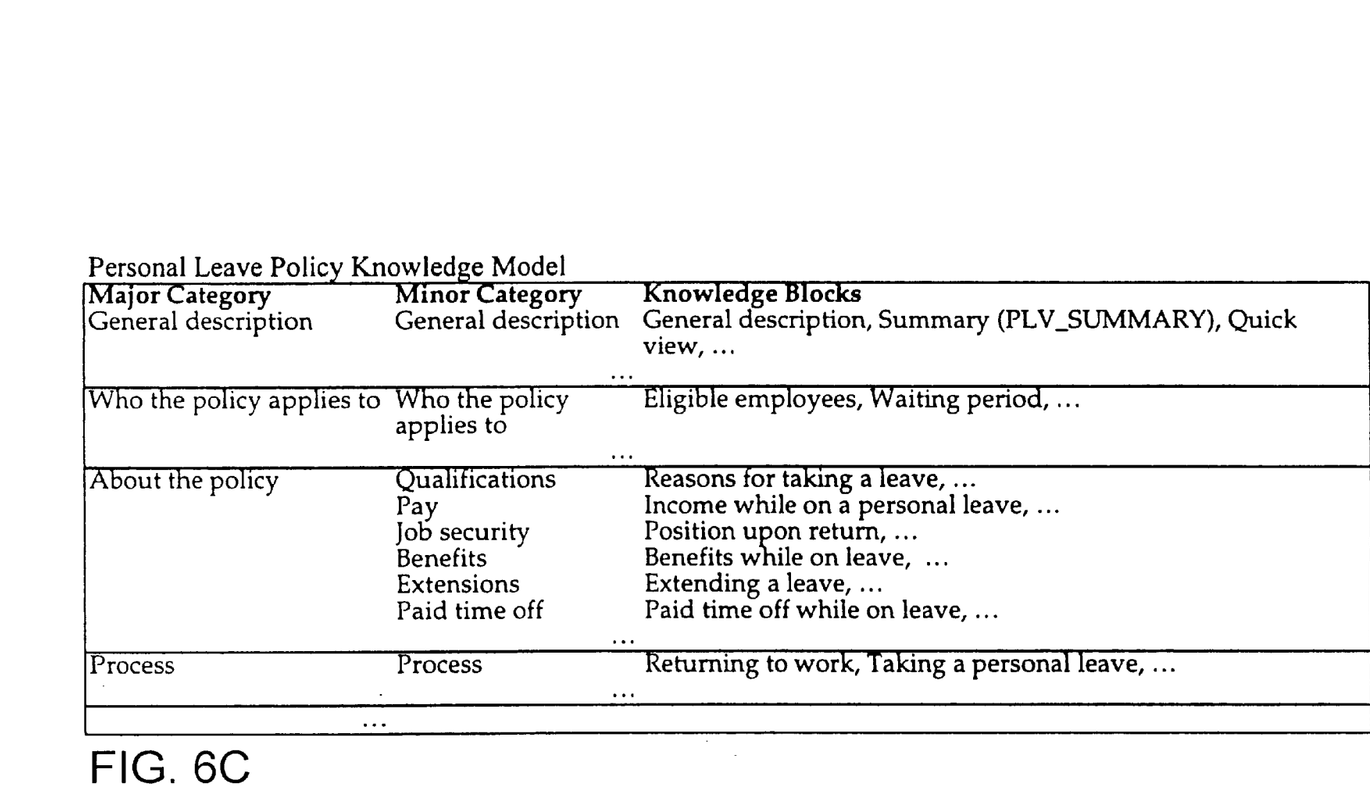

FIGS. 6A–6C show various knowledge models organized for content authoring. Specifically, FIG. 6A shows a medical plan knowledge model hierarchically organized with major categories, minor categories, and the knowledge blocks. E.g., the "eligibility" major category is divided into "employee eligibility" and "dependent eligibility" minor categories. There are corresponding knowledge blocks for each of these minor categories, which can then be inserted into presentation templates with a presentation that is organized for the convenience of the user.

FIG. 6B shows a tuition reimbursement plan knowledge model with a similar hierarchical organization. Finally, FIG. 6C shows a personal leave policy knowledge model which is organized for update maintenance and construction by the domain expert. The advantage is, however, is that the knowledge blocks may be inserted into different presentations regarding maternity leave and educational related leave.

Figure 7:
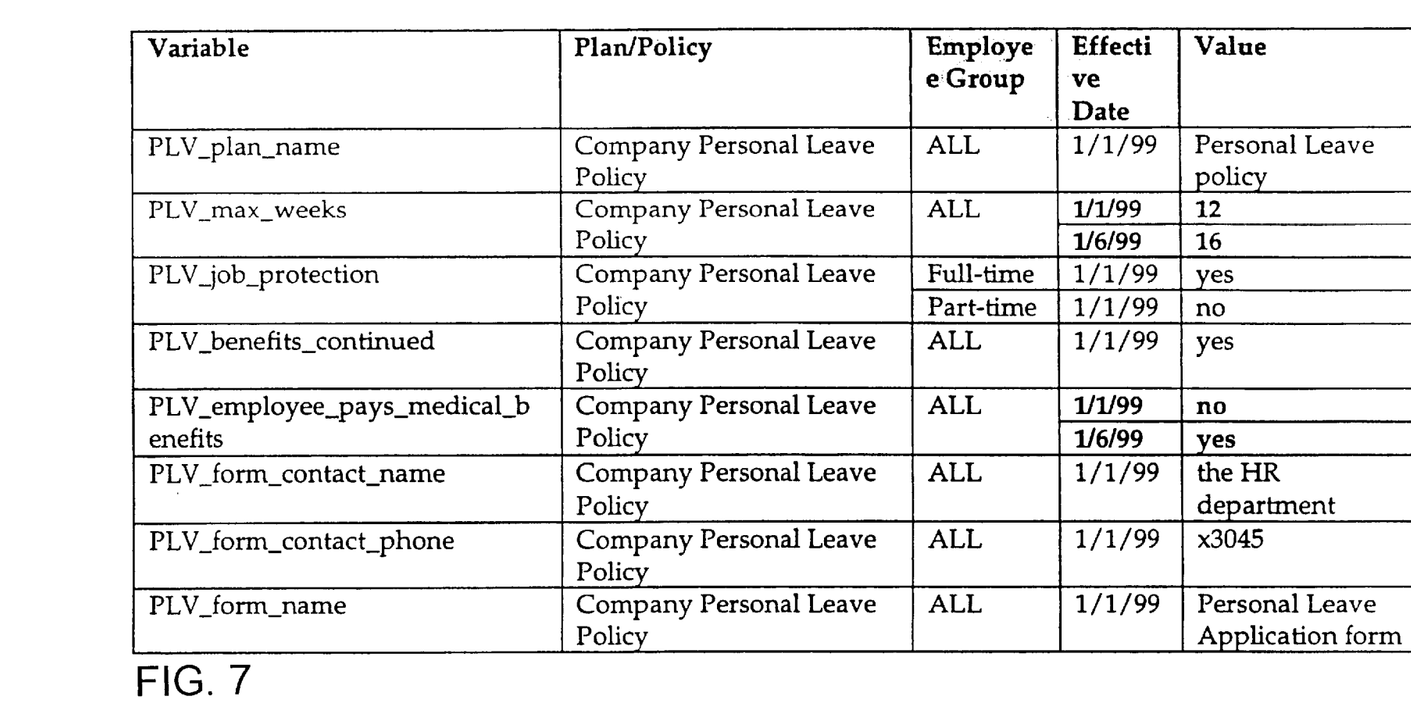
FIG. 7 illustrates the contents of the information repository in which plan-specific and employee group-specific variable assignments are provided.

FIG. 7 shows an exemplary information repository 103. Specifically, variable assignments are made according to a querying employee's plan, employee group, and effective date. Thus, there are different instantiations of the policy depending on the employee's plan, employee group, and effective date. These different instantiations may be seen by comparing FIGS. 2A and 3A or 2B and 3B. Thus, group-specific information is inserted into the knowledge blocks, and therefore the presentation, to provide targeted responses to queries in a user-friendly fashion without artifacts from the knowledge-model's organization. Variable assignments may also be drawn from information contained in the company's HRMS.

While this invention has been particularly shown and described with references to specific embodiments thereof, it will be understood by those skilled in the art that various changes in form and details may be made therein without departing from the spirit and scope of the invention as defined by the appended claims.

What is claimed is:

1. A knowledge-based information dissemination system, comprising:
   at least one knowledge model constructed using at least one knowledge block where the at least one knowledge model is organized as determined by a content author;
   a presentation template repository comprising at least one presentation template, the contents of said presentation template repository being organized in a manner designed to best convey information to different classes of system users operating in different contexts, in which different presentation templates are capable of incorporating the same knowledge blocks; and a compiler that delivers presentations to system users by combining the at least one presentation template with the at least one knowledge block.

2. The knowledge-based system as described in claim 1, wherein the at least one knowledge block is hierarchically organized within the at least one knowledge model.

3. The knowledge-based system as described in claim 1, wherein the at least one knowledge block is organized by major categories and minor categories within the at least one knowledge model.

4. The knowledge-based system as described in claim 1, wherein the at least one knowledge block comprises rules, text, and variable references.

5. The knowledge-based system as described in claim 4, wherein the compiler interprets, in view of the context in which a user is operating, the rules, text, and variables contained in said at least one knowledge block.

6. The knowledge-based system as described in claim 1, wherein the at least one knowledge block references at least one variable, the value of said at least one variable being determined by the compiler based on the variable assignments within an information repository and the user's context in which the at least one variable is referenced.

7. The knowledge-based system as described in claim 6, wherein the user's context in which a variable is referenced is matched against the attributes of the information within the information repository.

8. The knowledge-based system as described in claim 7, wherein the variable assignments are created using attributes selected from the group consisting of employee group, plan, and the effective date.

9. The knowledge-based system as described in claim 7, wherein the markup language is selected from the group consisting of HTML and XML.

10. The knowledge-based system as described in claim 1, wherein the at least one presentation template is formatted in a markup language derived from SGML.

11. The knowledge-based system as described in claim 1, further comprising an information server that receives user queries via a user-operated browser and that transfers to the browser the presentations generated by the compiler.

12. The knowledge-based system as described in claim 1, further comprising an information server that is accessed by another application program and that transfers to users the presentations generated by the compiler in a manner selected from the group consisting of direct and indirect transmission.

13. A knowledge-based human resource information dissemination system, comprising:

at least one knowledge model constructed using at least one knowledge block that is organized by a content author and that contains at least one reference to at least one variable;

an information repository comprising at least one value assigned to the at least one variable;

at least one variable attribute;

a presentation template repository comprising at least one presentation template, the contents of said presentation template repository being organized in a manner designed to best convey information to different classes of system users operating in different contexts, in which different presentation templates are capable of incorporating the same knowledge blocks; and a compiler that delivers presentations to a system user by combining a presentation template with content supplied by the knowledge model and variable attributes from the information repository.

14. The knowledge-based system as described in claim 13, wherein the at least one knowledge block is hierarchically organized within the knowledge model.

15. The knowledge-based system as described in claim 13, wherein the at least one knowledge block is organized by major categories and minor categories within the at least one knowledge model.

16. The knowledge-based system as described in claim 15, wherein the variable assignments are created using attributes selected from the group consisting of employee group, plan, and the effective date.

17. The knowledge-based system as described in claim 13, wherein the at least one knowledge block comprises rules, text, and variable references.

18. The knowledge-based system as described in claim 17, wherein the compiler interprets, in view of the context in which a user is operating, the rules, text, and variables contained in said at least one knowledge block.

19. The knowledge-based system as described in claim 13, wherein the value of said at least one variable is determined by the compiler based on the variable assignments within the information repository and the user's context in which the at least one variable is referenced.

20. The knowledge-based system as described in claim 18, wherein the user's context in which said at least one variable is referenced is matched against the attributes of the information within the information repository.

21. The knowledge-based system as described in claim 13, wherein the at least one presentation template is formatted in a markup language derived from SGML.

22. The knowledge-based system as described in claim 21, wherein the markup language is selected from the group consisting of HTML and XML.

23. The knowledge-based system as described in claim 13, further comprising an information server that receives user queries via a user-operated browser and that transfers to the browser the presentations generated by the compiler.

24. The knowledge-based system as described in claim 13, further comprising an information server that is accessed by another application program and that transfers to users the presentations generated by the compiler in a manner selected from the group consisting of direct and indirect transmission.

25. A method of providing information, the method comprising the steps of:

accessing a presentation repository to identify and select a presentation template that is most responsive to a request for information and that references at least one knowledge model comprising at least one knowledge block; the presentation repository and the presentation template being accessed on a machine-readable medium, the knowledge block containing knowledge associated with physical objects or activities, incorporating content into the selected presentation template by means of a compiler based on the requirements of the at least one knowledge model referenced by the presentation template; the compiler being accessed on a machine-readable medium, and displaying a presentation to a user comprising the presentation template which includes the incorporated content.

26. The method as described in claim 25, wherein the content is derived based on the interpretation of the at least one knowledge block.

27. The method as described in claim 25 wherein the presentation repository is accessed in response to a user query.

28. The method as described in claim 25, wherein the compiler interprets in view of the context in which a user is operating rules, text, and at least one variable contained in said at least one knowledge block.

29. The method as described in claim 28, wherein the presentation contains human resource-related information and the value associated with the at least one variable is determined by the compiler after the user context is determined based on employee group-specific information, benefit plan-specific information, and the effective date.

30. The method as described in claim 25, further comprising hierarchically organizing the content in the at least one knowledge block within the knowledge model.

31. A method of answering human resource queries, the method comprising the steps of in response to a user query, accessing a presentation repository comprising at least one presentation template to identify and select a presentation template that is responsive to the query; the presentation repository and the presentation template being accessed on a machine-readable medium, incorporating content into the selected presentation template in accordance with a knowledge model associated with said template, said knowledge model comprising at least one knowledge block; the knowledge model being accessible on a machine-readable medium and containing knowledge associated with physical objects or activities, and inserting employee information from a HRMS and employee group-specific information, benefit plan-specific information, and effective date information into the at least one knowledge block from the knowledge model by reference to an information repository, and displaying a presentation to a user comprising the presentation template which includes the incorporated content.

\* \* \* \* \*